United States Patent
Shelton

[15] 3,658,421
[45] Apr. 25, 1972

[54] ENGINE AIR FILTER REPLACEMENT AND SIZE INDICATOR

[72] Inventor: Clark R. Shelton, Sarasota, Fla.
[73] Assignee: Filter Finder, Inc.
[22] Filed: Sept. 8, 1970
[21] Appl. No.: 70,059

[52] U.S. Cl. ...........................356/72, 33/178 B, 250/223 B, 350/311, 350/318, 356/201, 356/244, 356/256
[51] Int. Cl. ..............G01n 21/00, G01n 21/16, G02b 27/32
[58] Field of Search......................356/72, 173, 201, 213, 236, 356/239, 240, 256; 250/223 B, 227, 228; 350/311, 318; 240/2 AD, 2 AT; 33/178 B

[56] References Cited

UNITED STATES PATENTS

| | | | |
|---|---|---|---|
| 69,954 | 10/1867 | Richards | 3/178 B |
| 1,199,284 | 9/1916 | Lieser | 33/178 B |
| 3,116,885 | 1/1964 | Morse | 355/311 X |
| 3,233,352 | 2/1966 | Projector et al. | 40/130 |
| 3,355,583 | 11/1967 | Sellenraad et al. | 350/318 UX |
| 3,504,339 | 3/1970 | Bailey | 340/84 |

Primary Examiner—Ronald L. Wibert
Assistant Examiner—Warren A. Sklar
Attorney—Clarence A. O'Brien and Harvey B. Jacobson

[57] ABSTRACT

A translucent conical member passes light therethrough from a lamp positioned within the member. When an annular carburetor filter is positioned on the member, the light passes through the filter material and exposes the condition of the filter. A vertical recess is formed in the wall of the conical member and a printed aluminum foil tape, received within the recess, has markings thereon for indicating the stock number of a replacement filter. The different markings correspond to varying filter inner diameters.

2 Claims, 4 Drawing Figures

PATENTED APR 25 1972 3,658,421

Clark R. Shelton
INVENTOR

Clarence A. O'Brien
and Harvey B. Jacobson
Attorney

ENGINE AIR FILTER REPLACEMENT AND SIZE INDICATOR

The present invention relates to gauges and more particularly to a conical gauge for measuring the inner diameter of a mounted annular carburetor cleaner. The gauge is translucent for allowing passage of light therethrough to inspect the condition of the filter.

During the present time, there are several major carburetor filter manufacturers who supply automobile service stations with replacement filters. The manufacturers use different stock numbers for designating the various sizes of carburetor filters. Accordingly, it is difficult for the service station to promptly determine which replacement is required for a particular automobile that is equipped with a filter made by a manufacturer other than the manufacturer used by the service station. Usually, the service attendant proceeds with a trial and error method of comparing the old carburetor filter with the filters he has on hand in the service station until a match is obtained. As will be appreciated, this is needlessly time consuming.

A further problem encountered by service people is the prompt determination of the condition of an old carburetor filter installed in an automobile undergoing servicing. Rather than determining the condition of the filter from a cursory examination of dirt accumulated around the outer periphery of the filter, it would be desirable if a more thorough inspection could be obtained.

The present invention utilizes the principle of a conventional jewelry ring gauge. The conical shape of the present invention allows an annular carburetor air filter to be easily positioned for a rapid determination of its inner diameter. Instead of indicating diameter, markings on the gauge indicate stock numbers corresponding to diameter.

A light disposed inside the member shines its light outwardly through the translucent body and through the filter material. Thus, a thorough inspection as to the condition of the filter can be had.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
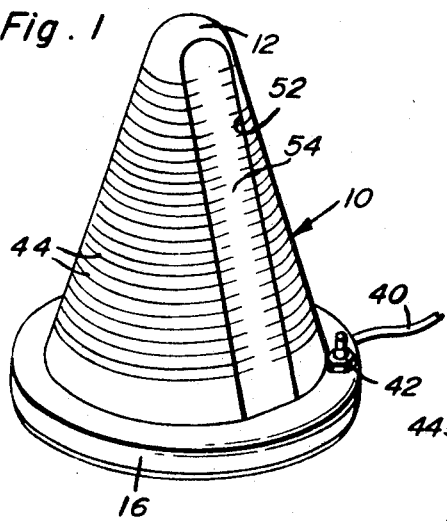
FIG. 1 is a perspective view of the present invention.
Figure 2:
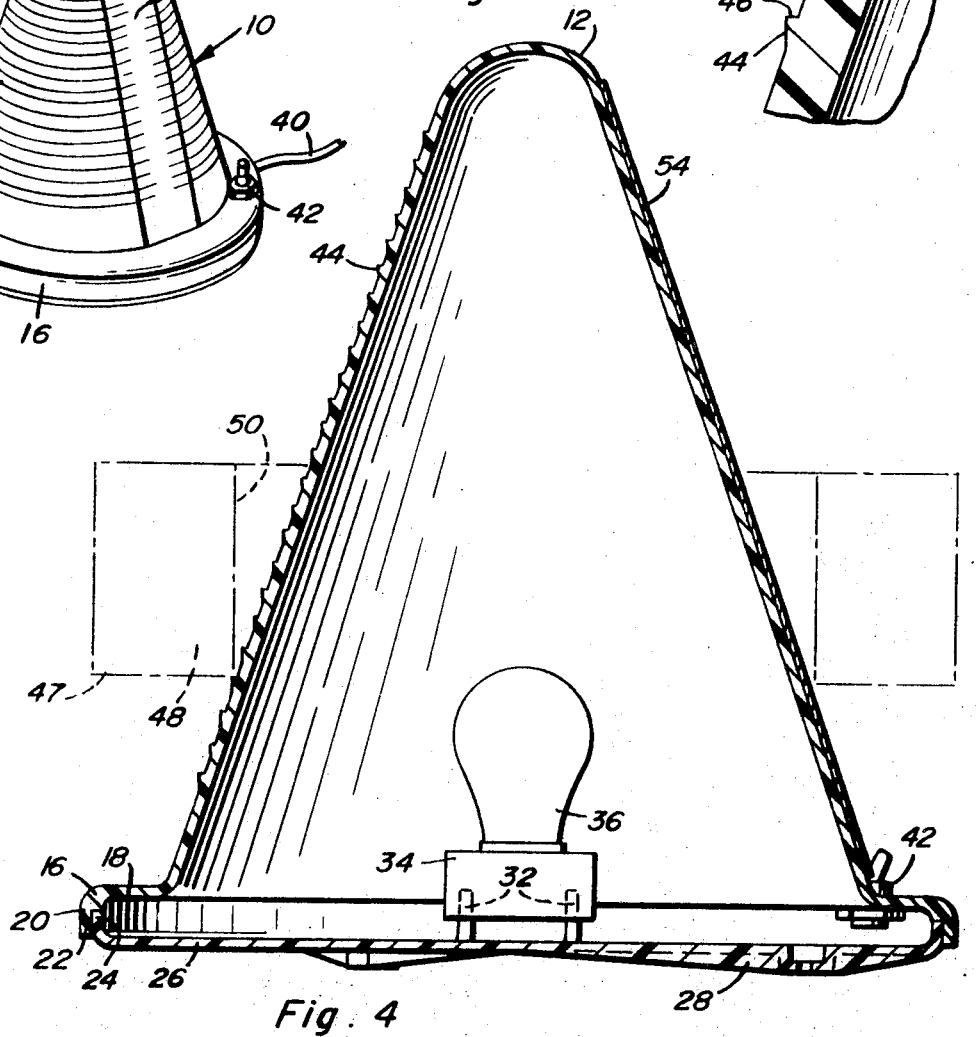
FIG. 2 is a vertical sectional view illustrating the present invention with an air filter mounted thereon.
Figure 4:
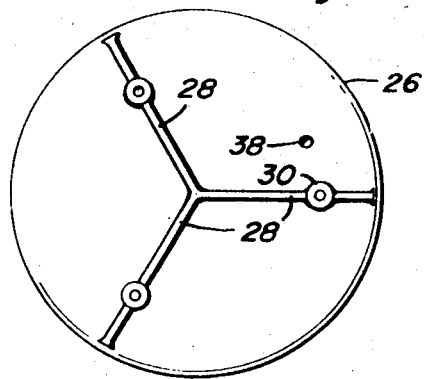
FIG. 4 is a bottom view of the invention.

Referring to the FIGS., the present invention is generally indicated by reference numeral 10 and includes a hollow conical member 12 terminating at a lower end in an integrally formed element 16 having a horizontal flange 18 extending to a vertical downturned flange 20. An annular vertical slot 22 is formed in the vertical flange 20 and receives the upturned peripheral edge 24 of a dish-shaped base member 26. Three radially extending rims 28 are formed on the bottom of the base member 26 and are preferably disposed at 120° from each other. As shown in FIG. 2, each rib is triangularly shaped and includes the formation of a boss at the intermediately disposed apex to serve as a base support foot. The boss is indicated by reference numeral 30 and is clearly shown in FIG. 4. Integrally attached posts 32 extend upwardly from the upper surface of the base 26 and serve to mount a lamp socket 34 which receives an electric lamp 36. A hole 38 is formed in the base 26 and allows passage of a power cord 40 (FIG. 1) therethrough. The power cord is connected to the socket via an on-off switch 42 in the usual manner (not shown). The switch is mounted to the horizontal flange 18 and controls selective energization of the lamp 36 which emits light through the translucent conical member.

Figure 3:
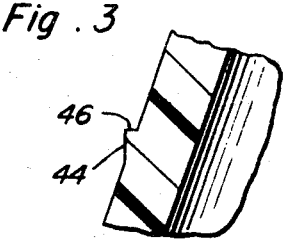
FIG. 3 is a sectional view illustrating filter supporting ridges on the body of the invention.

A series of annular ridges 44 are formed along the length of the conical member 12. As will be noted in FIG. 3 the ridges have a triangular-shaped cross section that includes a horizontal edge 46 that supports the lower end 47 of a conventional air filter 48 (shown in phantom). The diameters of the ridges increase in the downward direction and the ridges are closely spaced so that a filter comes to horizontal rest on a ridge having substantially the same diameter as the central opening 50 in the filter. With lamp 36 energized, light shines through the conical body and then through the material of the filter to expose the condition of the filter.

An elongated recess 52 is formed lengthwise along the conical member and receives a printed aluminum tape 54 that is glued or otherwise suitably attached inside the recess. The foil tape has indicia thereon for relating vertical marks to filter stock or catalog numbers. These marks correspond to filter inner diameters. In lieu of the foil, other types of labels may be used.

In summary, the present device performs two functions which are (1) to determine the size of the carburetor air filter so that replacement of an old filter is expedited, and (2) to determine whether an old air filter is in need of replacement.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention as claimed.

What is claimed as new is as follows:

1. A filter condition and size indicating structure to be used in conjunction with annular automotive air filter elements of various sizes, said structure including a generally conical upright hollow body provided with longitudinally spaced outwardly projecting annular ridges extending substantially completely thereabout and disposed in planes generally normal to the center axis of said body, said ridges including planar surfaces facing toward the minor diameter end of said body and outer cylindrical surfaces, said body including tapering frustoconical outer surfaces disposed between adjacent ridges, the inner and outer diameters of at least some of said planar surfaces being less and greater, respectively, than the inside diameters of predetermined annular automotive air filter elements, said body being constructed of a shape-retaining material permitting the passage of light therethrough, and illumination means disposed within said body for casting light outwardly through said body from the interior thereof, whereby an annular automotive air filter element disposed on said body and seated on one of the last mentioned planar surfaces will be illuminated from within its inner periphery and the amount of dirt clinging to the filter surfaces of the filter element will be visible and partially block the passage of light through the filter to thereby render a visual indication of whether the filter element becomes sufficiently dirty to warrant replacement.

2. The combination of claim 1 wherein one side of said conical body includes an upstanding recess interrupting said ridges and disposed in a generally diametric plane of said body, and a printed tape having a scale thereon including indicia representing a manufacturer's filter stock number corresponding to the measured inner diameter of a filter element positioned on said body.

* * * * *